Figure 1:
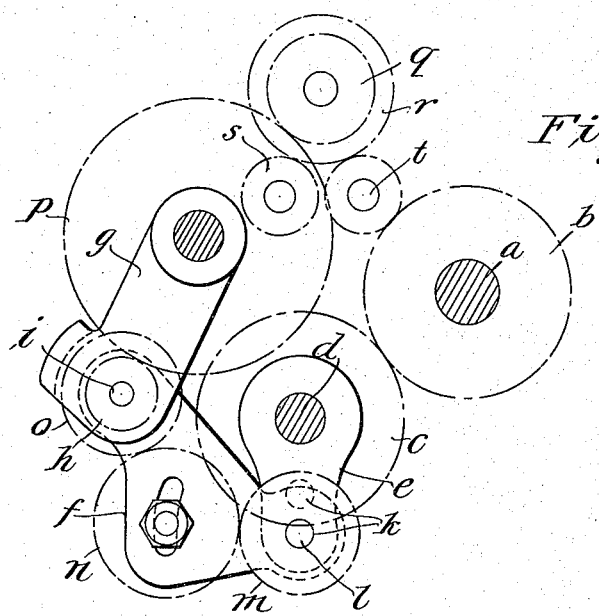

P. A. HELMBOLD & J. WEINBRENNER.
DRIVING MECHANISM FOR THE DRAWING-OFF OR DETACHING ROLLERS OF COMBING MACHINES.
APPLICATION FILED MAR. 25, 1914.

1,156,225. Patented Oct. 12, 1915.

Inventors:
Paul A. Helmbold,
Julius Weinbrenner,

Heard, Smith & Tennant.

UNITED STATES PATENT OFFICE.

PAUL AUGUST HELMBOLD AND JULIUS WEINBRENNER, OF ALSACE, GERMANY.

DRIVING MECHANISM FOR THE DRAWING-OFF OR DETACHING ROLLERS OF COMBING-MACHINES.

1,156,225.  Specification of Letters Patent. Patented Oct. 12, 1915.

Application filed March 25, 1914. Serial No. 827,223.

*To all whom it may concern:*

Be it known that we, PAUL AUGUST HELMBOLD and JULIUS WEINBRENNER, subjects of the Emperor of Germany, residing in Alsace, Germany, have invented new and useful Improvements in Driving Mechanism for the Drawing-Off or Detaching Rollers of Combing-Machines, of which the following is a specification.

This invention has reference to improvements in driving mechanism for the drawing-off or detaching rollers of combing machines, and it consists in a mechanism by which the requisite forward and backward motion of the detaching roller in a combing machine is imparted.

In accordance with the present invention an iscillatory motion is imparted on the one hand and a uniform motion on the other hand to the spindle of a toothed wheel by a crank mechanism the crank pin of which is utilized as the driving point for producing the uniform motion and rotates once relatively to the connecting rod for each stroke of the said rod, the rotation being transmitted to the oscillating toothed wheel by a train of wheels fixed on the connecting rod and swinging therewith. These two motions of the toothed wheel imparted by the crank mechanism, summed up and transmitted to the detaching roller by intermediate wheels, produce the characteristic forward and backward motion of the said roller.

Provision is made for varying the magnitude of the oscillating motion by changing the effective length of the crank arm and further for enabling wheels having a different number of teeth to be inserted for the purpose of varying the feed-action of the detaching cylinder.

Figure 2:
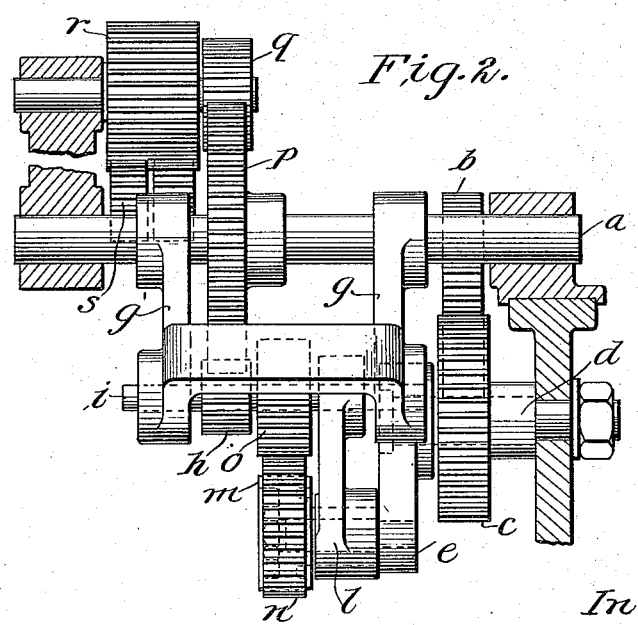

We have illustrated our invention in the accompanying drawing, in which:

Figure 1 shows diagrammatically a front view, and Fig. 2 a side elevation.

Motion is transmitted from the shaft $a$ of the circular comb through the pair of toothed wheels $b$, $c$ to the shaft $d$ upon which the crank $e$ is fixed. By means of the crank rod $f$, which is coupled on the one hand to the crank arm $e$ and on the other hand to an arm $g$, a toothed wheel $h$ mounted rotatably on the arm $g$ is driven from the crank arm $e$ in such a manner that its spindle $i$ has an oscillating motion imparted to it. The magnitude of the oscillation can be regulated by varying the effective length of the crank arm by placing the crank pin $l$ in different holes $k$. The crank pin $l$ carries the toothed wheel $m$ which is rigidly connected therewith and cannot rotate on its own axis. The said wheel therefore makes one rotation simultaneously with each rotation of the crank, and thus brings about each time through the intermediary of the toothed wheel $n$ a rotation around its axis of the wheel $o$ and the wheel $h$ which is rigidly connected with same. The toothed wheel $p$ thus receives from the wheel $h$ two motions, one of which is a to-and-fro swinging motion while the other is a rotary motion always in the same direction. The sum of these two motions is transmitted from the wheel $p$ by means of the intermediate wheels $q$, $r$ and $s$ to the shaft $t$ of the detaching roller and produces the characteristic forward and backward movement of same.

By replacing the wheel $o$ by a wheel with a different number of teeth, the feed-action of the detaching roller can be varied according to requirements.

What we claim as our invention and desire to secure by Letters Patent is:—

1. In a driving mechanism for the detaching roller of a combing machine, the combination of a toothed wheel geared to the detaching roller, a radial arm mounted to swing around the axis of the said toothed wheel, a spindle carried rotatably by the free end of the said arm, a pinion fixed on the said spindle and in gear with the said toothed wheel, a second pinion fixed on the said spindle, and a crank mechanism interposed between the driving shaft of the machine and the said toothed wheel and comprising a crank arm, a connecting rod coupled to the said arm and to the spindle on which the aforesaid pinions are mounted, and a gear wheel fixed on the crank arm and geared to the second pinion on the aforesaid spindle.

2. A driving mechanism for the detaching roller of a combing machine, comprising a crank shaft geared to the driving shaft of the machine, a toothed wheel mounted rotatably on an intermediate shaft and geared to the detaching roller, a crank arm fixed on the said crank shaft, a crank pin carried by the said crank arm, a radial arm mounted to swing around the axis of the aforesaid toothed wheel, a spindle rotatably carried by the said radial arm near its free end, a gear wheel fixed on the said spindle and in gear with the aforesaid toothed wheel, a connecting rod pivotally mounted at one end upon the said spindle and at its other end upon the aforesaid crank pin, a gear wheel mounted non-rotatably relatively to the crank arm on the said crank pin, a second gear wheel fixed on the aforesaid spindle, and an intermediate gear wheel mounted rotatably on the connecting rod and gearing on the one hand with the said second gear wheel and on the other hand with the gear wheel on the crank pin, substantially as set forth.

In testimony whereof we have signed our names to this specification in the presence of two subscribing witnesses.

PAUL AUGUST HELMBOLD.
JULIUS WEINBRENNER.

Witnesses:
ARNOLD ZUBER,
PHILIP HOLLAND.

Copies of this patent may be obtained for five cents each, by addressing the "Commissioner of Patents, Washington, D. C."